United States Patent
Qiang

(10) Patent No.: US 8,725,160 B2
(45) Date of Patent: May 13, 2014

(54) OFFLINE DEVICE PAGING

(75) Inventor: Zu Qiang, Kirkland (CA)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 0 days.

(21) Appl. No.: 13/401,398

(22) Filed: Feb. 21, 2012

(65) Prior Publication Data

US 2012/0214502 A1    Aug. 23, 2012

Related U.S. Application Data

(60) Provisional application No. 61/444,923, filed on Feb. 21, 2011.

(51) Int. Cl.
*H04W 72/00* (2009.01)

(52) U.S. Cl.
USPC .......................................................... 455/451

(58) Field of Classification Search
USPC ................... 455/450, 451, 452.1, 452.2, 453
See application file for complete search history.

(56) References Cited

U.S. PATENT DOCUMENTS

| | | | |
|---|---|---|---|
| 2004/0214574 A1* | 10/2004 | Eyuboglu et al. | 455/439 |
| 2007/0232321 A1* | 10/2007 | Casati et al. | 455/456.1 |
| 2009/0279502 A1* | 11/2009 | Zheng et al. | 370/331 |
| 2010/0040011 A1* | 2/2010 | Kang et al. | 370/329 |
| 2010/0195621 A1* | 8/2010 | Kekki et al. | 370/332 |
| 2011/0009118 A1* | 1/2011 | Wu | 455/435.1 |
| 2011/0201343 A1* | 8/2011 | Pinheiro et al. | 455/450 |
| 2012/0014351 A1* | 1/2012 | Shahrier et al. | 370/331 |
| 2012/0020393 A1* | 1/2012 | Patil et al. | 375/222 |
| 2012/0039313 A1* | 2/2012 | Jain | 370/338 |
| 2012/0087274 A1* | 4/2012 | Meriau | 370/253 |
| 2012/0149383 A1* | 6/2012 | Wang et al. | 455/450 |

FOREIGN PATENT DOCUMENTS

| WO | 2011/002819 A1 | 1/2011 | |
|---|---|---|---|
| WO | WO 2011/051753 A1 * | 5/2011 | H04W 76/00 |

OTHER PUBLICATIONS

Ericsson et al.,NIMTC indicators,3GPP TSG CT WGI , Meeting #67, C1-103879, XP50444539,Oct. 2010, pp. 01-07, Barcelona,Spain.
3rd Generation Partnership Project;Technical Specification Group Services and System Aspects;Service requirements for Machine—Type Communications (MTS); Stage1 (release11); 3GPP TS 22.368 V11.0.1, XP50476264A, Feb. 2011, pp. 01-23, France.
Acatel-Lucent Shanghai Bell et al.,Discussion on MTC idle states, 3GPP TSG-WG #69-bis , R2-102033, XP50422289A, Apr. 2010, pp. 01-04, Beijing.
3rdGeneration Partnership Project;Technical Specification Group Services and System Aspects;System Improvements for Machine—Type Communications ; (Release11), 3GPP TR 23.888 V1.0.1 , XP50523561, Feb. 2011, pp. 01-80, France.

(Continued)

*Primary Examiner* — Christopher M Brandt
(74) *Attorney, Agent, or Firm* — Ericsson Canada Inc.; Alex Nicolaescu

(57) ABSTRACT

The network resources allocated to Machine Type Communication (MTD) devices (also referred to as Machine-to-Machine (M2M) Devices) can be reduced through the introduction of a new device state in a network. The network device state, referred to as a sleep state, allows the network to offload context information about the device to another network element so that the resources allocated to the sleeping device can be released. When the device needs to be contacted by a network element, the stored context information can be retrieved to facilitate paging the otherwise offline device.

16 Claims, 5 Drawing Sheets

(56) References Cited

OTHER PUBLICATIONS

3GPP TS 23.401 V10.2.1: 3rd Generation Partnership Project; Technical Specification Group Services and System Aspects; General Packet Radio Service (GPRS) enhancements for Evolved Universal Terrestrial Radio Access Network (E-UTRAN) access (Release 10); Jan. 2011; 276 pages.

* cited by examiner

OFFLINE DEVICE PAGING

CROSS-REFERENCE TO RELATED APPLICATIONS

This application claims the benefit of priority from U.S. Provisional Patent Application No. 61/444,923 filed Feb. 21, 2011 and entitled "Offline Device Paging", the contents of which are expressly incorporated herein by reference.

TECHNICAL FIELD

This disclosure relates generally to enabling a new status condition for devices connected to a network through a radio access channel.

BACKGROUND

In conventional cellular networks, a device connected through a radio access channel has often been thought of as a mobile device. As a result, the rules governing the behavior of the device, and the manner in which the device is handled in the network have been designed to account for the fact that the device is mobile and will be prone to moving between cells.

This perception is starting to change, as there is a growing demand for Machine-to-Machine (M2M) devices, which engage in what is often referred to as of machine type device communication (MTC).

The machine type device is often viewed as a sensor or a meter, such as an electrical or water consumption meter, although other types of connected devices are known. These devices use radio access channels to connect to the same data network that mobile devices connect to, but they are often less mobile and more tolerant of many other conditions. As these devices become more common, the expected number of deployed MTC devices will increase, possibly into the millions. As the numbers of deployed devices expand, the number of active devices in a network cell will also likely increase. One skilled in the art will appreciate that there are practical limits to the number of different devices that can share a cell in a radio access network. Beyond that limit, the quality of connection is degraded, and network planning must be re-evaluated. A number of different approaches can be pursued to mitigate the effects of a large number of MTC devices in a cell. One solution is to restrict the number of MTC devices will a connection to the cellular network through the use of other networking technologies. As an example, devices can be connected to each other through a WiFi network (IEEE 802.11x) and only one of the devices will then connect to the radio access network. This offers a number of benefits, but can introduce problems in allowing a plurality of different vendors from offering solutions.

Even with the use of gateways, the number of devices in a given network cell can increase to the point at which there are too many MTC devices active at a single time. When this happens, the degraded radio access network connection will be noticeable, will adversely affect the experience of human operated devices and will cause operational difficulties for the network. Often the communications of an MTC device are not immediately time-sensitive, and can easily be delayed when data traffic volumes are high, whereas for a human operated device, this is seen by the user as being a network outage. As the number of MTC devices increases, there is an increased likelihood of the MTC devices contributing to or causing network overloading. This will likely be caused if too many machine type devices communicate with the network at the same time. Even if each MTC device only generates a small amount of data signaling traffic, a sufficiently large volume of devices will lead to network overloading.

From the perspective of a network operator it is desirable to reduce the amount of network signaling caused by these devices. It may also be advantageous for the MTC device to remain offline if it is not active. However, the devices often cannot be inactivated as they must be reachable by network elements. Conventional devices can enter a sleep mode to conserve power (which is very useful when the device is powered by batteries) but the device typically remains sufficiently active to respond to a network page. To the network, this device is still attached, and consumes resources in the network. From the network perspective, the device is either seen as being attached to the network or detached from the network. When a device is connected, or attached to the network, resources are consumed in the network to allow the device to be contacted. When the device is detached, the network no longer has enough information to contact the device.

Many mobile network standards are developed by the 3rd Generation Partnership Project (3GPP). Current 3GPP standards define devices (also referred to as user equipment (UE)) as being either REGISTERED or DEREGISTERED. A REGISTERED device can be IDLE or connected. In the DEREGISTERED state, no UE context information is saved in the network. The UE location (part of the context information) of a DEREGISTERED device is not available, and as such the network does not have sufficient information to allow it to page the device, as such the UE is determined to be not reachable.

In the REGISTERED state, the UE has performed a successful registration with the network. The network has valid context information for the UE including valid location or routing information. This location information need not be exact but instead can simply identify the last cell or cells that the UE was known to be in. This allows the network to generate a page that will reach the UE. The UE is typically required update the network by performing a Tracking Area Update procedure, either periodically or when moving into a new tracking area (such as a new cell). This allows the network to have current location context for the UE, and allows the UE to be reachable.

From a REGISTERED state, the UE enters CONNECTED state when there is traffic between the UE and the network. In a CONNECTED state, the network does not need to page the UE as there is an active connection. The UE remains in an IDLE state when no signaling between UE and network exists. An IDLE mode UE can be reachable by a paging procedure. As will be appreciated, both IDLE and CONNECTED devices are viewed as REGISTERED, and both consume resources in the network, although the resources that they consume may be different.

As the number of the machine type devices increases it is important to provide a mechanism to help to alleviate network overloading. To facilitate this, it is envisioned that a network operator may benefit from the ability to force an MTC device to remain effectively off-line when not communicating. Conventionally this means that the device would have to be DEREGISTERED, which would prevent to device from being reachable, and may result in increased traffic when a plurality of such devices all register at the same time. One skilled in the art will appreciate that DEREGISTERING a device to conserve resources is a generally undesirable result as the device is then no longer reachable.

There exist many prior art references, such as PCT Publication No. WO 2011/002819 A1 entitled "Device, method and Apparatus for Offline Discontinuous Reception (DRX)

Processing in Cellular Systems" that relate to how a mobile device can enter a power saving state and still receive network signaling, but there is a dearth of teachings on how the network can reduce the resources allocated to such a device.

Therefore, it would be desirable to provide a system and method that obviate or mitigate the above described problems

SUMMARY

It is an object of the present invention to obviate or mitigate at least one disadvantage of the prior art.

In a first aspect of the present invention, there is provided a method of managing resources allocated to user equipment in a network. The method comprises the steps of receiving an indication, transferring context information, and de-allocating network resources. In the step of receiving, an indication is received from a user equipment over a radio access network, that the user equipment is entering a low traffic state. In the step of transferring, context information associated with the user equipment is transferred to a secondary storage. In the step of de-allocating, network resources associated with the user equipment are de-allocated.

In an embodiment of the first aspect of the present invention, the step of receiving includes receiving a SLEEP request message. In another embodiment, the step of receiving further includes receiving an indication that the user equipment is unlikely to change network cells. In a further embodiment, the step of transferring includes transferring the context information to an external secondary storage, and optionally includes transmitting context information stored in a local primary storage to the secondary storage residing in a Machine Type Communication Tracking Server. In another embodiment, the step of de-allocating network resources includes discarding a portion of the context information transferred to the secondary storage. In a yet a further embodiment, the step of de-allocating network resources includes keeping a first part of the context information transferred to secondary storage, and discarding a second part of the context information transferred to secondary storage, and optionally includes transmitting a message to an external node instructing the external node to release resources allocated to the user equipment.

In a second aspect of the present invention, there is provided a node for storing context information about user equipment connected to a radio access network. The node comprises a primary storage, a radio interface, a network interface, and a processor. The primary storage is for storing context information associated with user equipment. The radio interface receives requests from user equipment, either directly through a radio access network interface or through a network interface connected to a radio access network base station. The network interface allows communication with external nodes. The processor receives, from a user equipment over the radio interface, an indication that the user equipment is entering a low traffic state, transmits to a secondary storage context information associated with the user equipment stored in the primary storage, deletes at least part of the context information transmitted to the secondary storage from the primary storage, and transmits a request to at least one external node over the network interface to release resources allocated to the user equipment in response to the receipt of the indication.

Other aspects and features of the present invention will become apparent to those ordinarily skilled in the art upon review of the following description of specific embodiments of the invention in conjunction with the accompanying figures.

BRIEF DESCRIPTION OF THE DRAWINGS

Embodiments of the present invention will now be described, by way of example only, with reference to the attached Figures, wherein.

DETAILED DESCRIPTION

Figure 1:
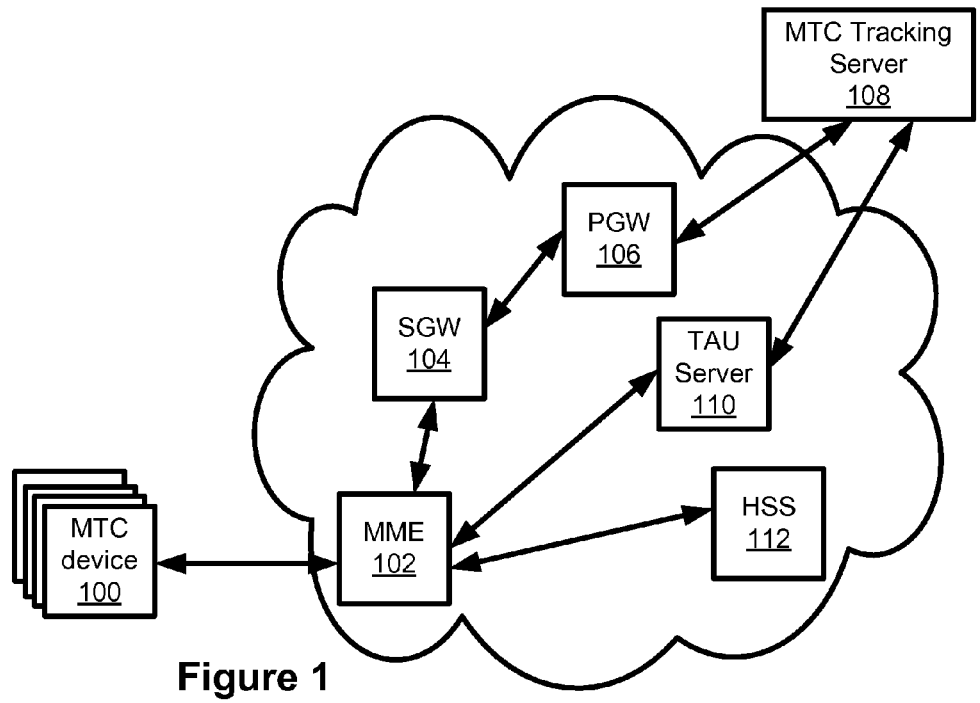
FIG. 1 is a block diagram illustrating an exemplary system architecture for an embodiment of the present invention.

The present invention is directed to a system and method for reducing the network resource consumption of IDLE, but connected MTC devices.

Reference may be made below to specific elements, numbered in accordance with the attached figures. The discussion below should be taken to be exemplary in nature, and not as limiting of the scope of the present invention. The scope of the present invention is defined in the claims, and should not be considered as limited by the implementation details described below, which as one skilled in the art will appreciate, can be modified by replacing elements with equivalent functional elements.

To facilitate the reduction in resources allocated to MTC devices, it must be realized that a mobile device must be registered so that it can update the location portion of its context information stored in the network. If a mobile device moves from one cell to another in the network it updates the context information, so that the network knows how to reach it for incoming calls or incoming data. Where the device is a low (or no) mobility MTC device, such as a meter or sensor affixed to a structure, there is less likelihood that the device will move from one cell to another. As a result, as long as the last known position is stored there is a low to zero probability that the device will need to report a new location.

To take advantage of this lack of mobility, a new UE state can be defined, and is hereinafter referred to as a SLEEP or SLEEPING state. One skilled in the art will appreciate that the name of the state can be varied in different implementations without departing from the scope of the present invention. Furthermore, it should be clear that this is a network state, so that the network views the device as sleeping, not a device state that is entered into to reduce power consumption, although it is understood that when the network status is step to SLEEPING, it is likely that the device will enter a sleep mode to conserve power.

In the SLEEPING state, the context information associated with the device is largely discarded by conventional network elements. The location information associated with the device that is stored in the context information is maintained, but is offloaded to an MTC tracking server. Any remaining context information can be discarded (although one skilled in the art will appreciate that keeping other information would not necessarily depart from the scope of the present invention). The UE, at this time, can receive an indication from the network that the network has assigned it a sleep state. This may result in the UE suspending or terminating resident applications to enter a power saving mode, although it may be preferable for the device to monitor the radio paging channel. If the UE detects that is has changed cells, or otherwise has non-signaling data to transmit, it can do so, but otherwise it will create no signaling traffic.

Because of the low signaling traffic associated with the SLEEPING device, the SLEEPING state shares many traits with the DEREGISTERED state. Effectively the resources allocated to a device can be largely released when the device enters the SLEEPING state.

As noted above, the location data for a device in the REGISTERED but SLEEPING state can be maintained in another node, herein referred to as the MTC tracking server. One skilled in the art that the MTC tracking server can be implemented, as shown in FIG. 1 as a separate element, and may be geographically distant from other network elements. Alternatively it can be implemented as part of the existing network elements such as the Mobility Management Entity, the Servicing Network Gateway, or the Packet Data Network Gateway. As shown in FIG. 1, any MTC device 100 connects to the network and interacts with the Mobility Management Entity (MME) 102. The MME 102 connects to the Servicing Network Gateway (SGW 104), the Tracking Area Update server 110, and the Home Subscriber Server 112. The SGW 104 provides a connection to the Packet Data Network Gateway (PGW 106), which in turn provides a connection to the MTC Tracking server 108. The MTC tracking server 108 is used to keep the UE context that was received and stored by the network prior to the last Sleep mode tracking area update (TAU) procedure, or Sleep Request procedure. The MTC tracking server 108 can enable new functions related to its role, such as: Sleep Request, Sleep mode TAU, Sleep mode Detach, Wake-up Request, and Wake-up Paging. The MTC tracking server 108 may also be connected to the TAU server 110 so that they can directly exchange data instead of routing their messaging through other nodes.

Figure 2:
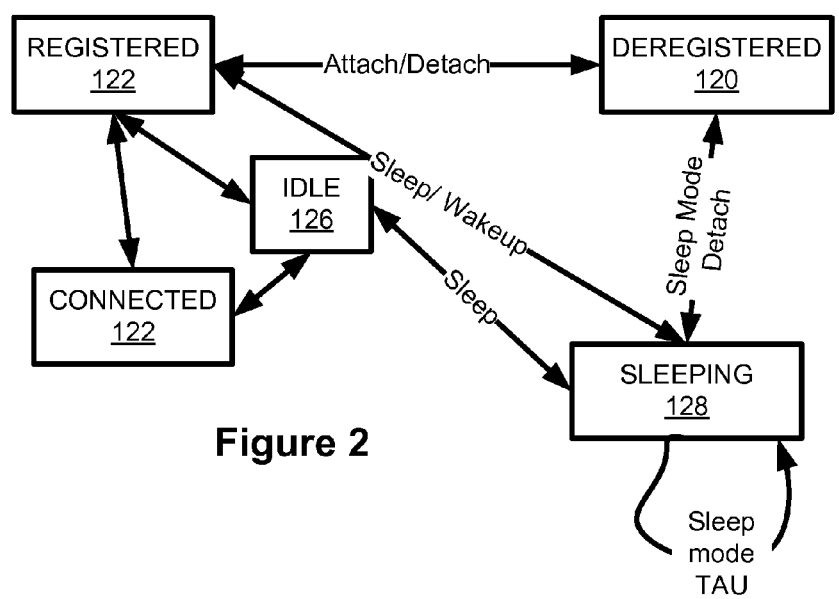
FIG. 2 is a flow diagram illustrating the transition between states in a system of the present invention.

The state of a device, as tracked by the network, can be understood in the context of a state change diagram such as that illustrated in FIG. 2. The UE can take on a state such as DE-REGISTERED 120, REGISTERED 122, CONNECTED 124, IDLE 126 AND SLEEPING 128. A standard network attach or detach operation can be used to move a UE between a DEREGISTERED state 120 and a REGISTERED state 122 and vice versa. Once REGISTERED 122, the existence of data traffic determines the movements between CONNECTE$D 124 and IDLE 126. From the REGISTERED state 122, a sleep request function can move the UE into SLEEPING state 128, while a wakeup procedure can move the SLEEPING state 128 to a REGISTERED state 122. From a SLEEPING state 128, a sleep mode TAU will leave the state unchanged, but a sleep mode detach message can move the state to DEGEGISTERED 120.

Figure 3:
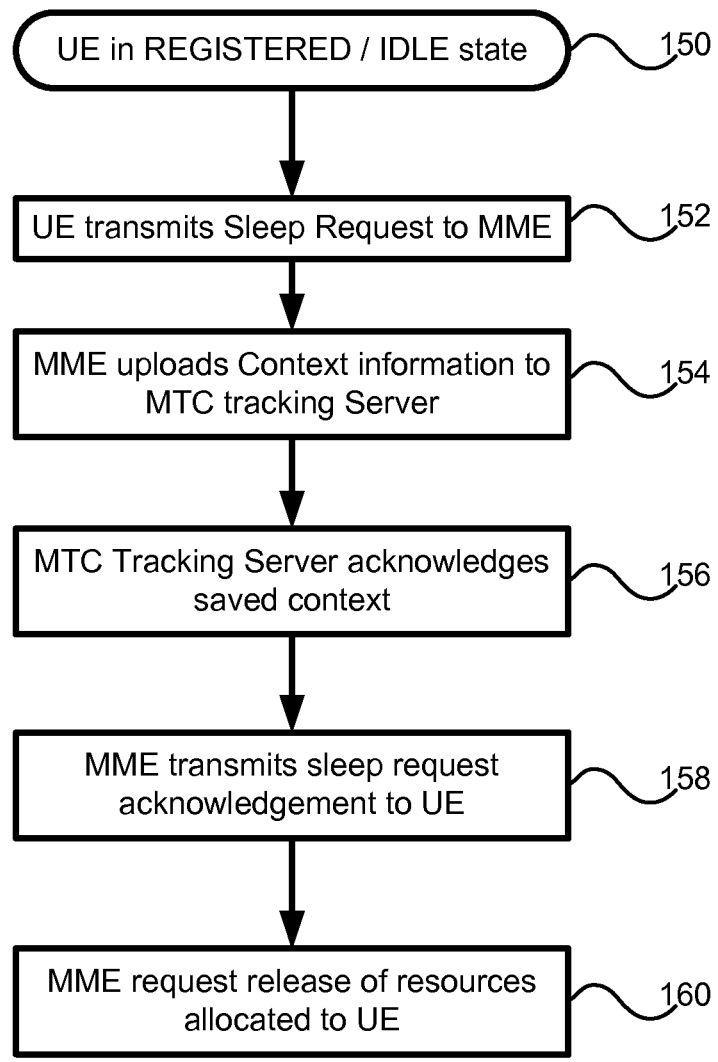
FIG. 3 is a flow chart illustrating a method of the present invention.

FIG. 3 illustrates an exemplary embodiment of a method of a device changing to a network sleep state. The process starts in step 159, with the UE REGISTERED. When the UE is in the REGISTERED or IDLE states it has a full complement of context information, and being an MTC device, it is likely to not move. The MTC UE can then send a Sleep Request to the MME in step 152. This request notifies the MME that the UE is entering a state in which it is unlikely to generate data traffic, and is not likely to leave the current location in the network. At least a portion of the UE context is then uploaded to the MTC tracking server for storage in step 154. In a presently preferred embodiment, the MTC tracking server will notify the MME that the request has been processed in step 156, and reply to the UE with a Sleep Request Ack message in step 158. The MME can then begin deallocating network resources associated with the UE in step 160. This may include releasing the UE context in the SGW/PGE through the use of a Delete Bearer Request Message. The MME then removes the UE context that it stores and the UE can switch into a device sleep state.

Figures 4, 5:
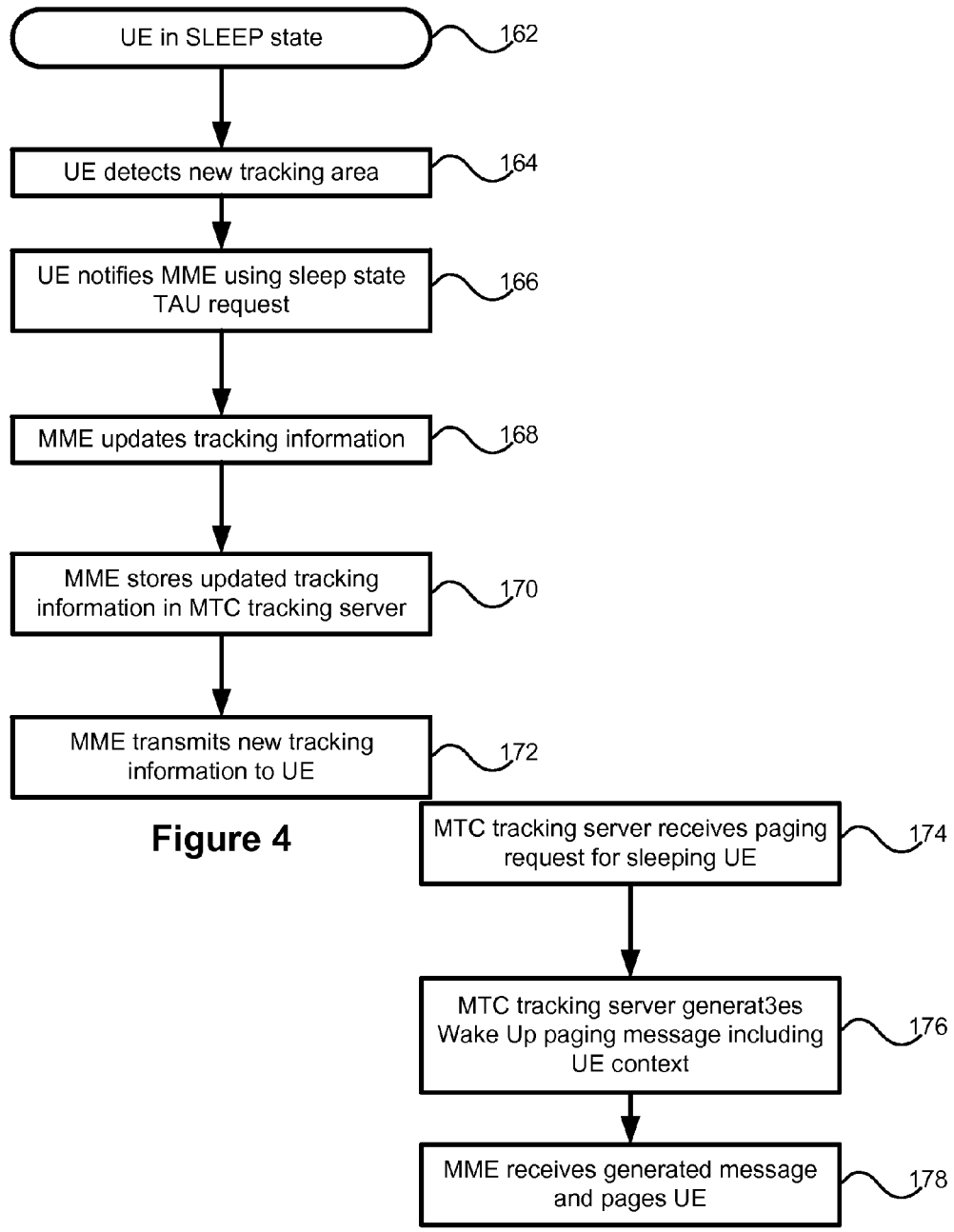
FIG. 4 is a flow chart illustrating a method of the present invention.
FIG. 5 is a flow chart illustrating a method of the present invention.

While in SLEEP mode, a TAU procedure can be triggered if the UE is moved into a new tracking area. In one embodiment of a system of the present invention, there is no periodicity specified for a TAU while the UE is in the SLEEPING State. One exemplary method for handling such a process is illustrated in FIG. 4. The process begins in step 162 when the UE is in its sleep mode. When the UE moves into a new tracking area in step 164, it generates a Sleep mode TAU request that is sent to the MME in step 166. The detection of a new tracking area can be performed using any of a number of techniques including an analysis of the signals received on the radio paging channel. The Sleep Mode TAU Request can be a relatively lightweight message to reduce signaling load, and as such may contain only a few parameters such as a UE identifier (UE ID). The location context can be derived by the network from the cell or base-station through which the Sleep Mode TAU is received. At this point the MME does not have any context associated with the UE and calculates a new Track Area list in step 168. The Sleep Mode TAU message with the UE ID and the new track area list is then sent to the MTC Tracking server in step 170. The MTC tracking server can then update its UE context with the new information, and acknowledge receipt of the message to the MME. The MME can respond to the UE with the new track area list in step 172. The UE can save the received track area list and remain in SLEEPING state.

When the UE needs to be reached, a Wake-up Paging procedure can be employed, as illustrated in FIG. 5. This is typically used when there a message in the network that should be sent to the MTC UE. The UE state is determined to be SLEEPING, and as such the network elements will request the UE context from the MTC Tracking Server. In step 174, the MTC tracking server receives the paging request. The MTC tracking server can generate a Wake-up Paging message that includes the UE context in step 176, and forward the generated message to the appropriate MME in step 178. The MME can then page the UE in the tracking areas identified in the UE context of the message. The UE, though it is sleeping, is monitoring the radio paging channel and will detect the paging message. Upon detecting a paging message addressed to itself, the UE will wake up and respond to any Service Request procedure. If needed, a PDN connection can be established between the UE and the MTC server.

Figure 6:
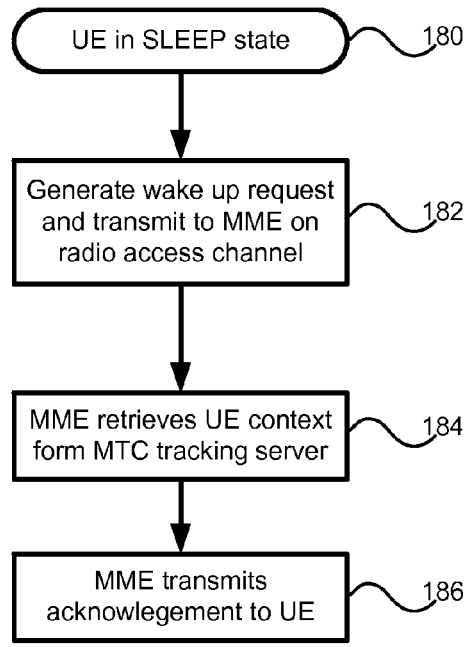
FIG. 6 is a flow chart illustrating a method of the present invention.

While the above procedure allows a device connected to the mobile network to cause the UE to wake up, a procedure for the UE to wake up on its own is also provided in FIG. 6. From the sleeping state of step 180, the UE can perform a Wake-Up Request procedure when it has a need to transmit data traffic. The UE generates a Wake-Up Request message and transmits the generated message to the MME on the radio access channel in step 182. The MME can then retrieve the UE context from the MTC Tracking Server in step 184. This allows the MME to avoid consuming the radio access channel resources in a determination of a context for the essentially unknown UE. The MME then replies to the UE with an Ack message in step 186. At this point the UE is back to a REGISTERED state and can then perform the Service Request procedure and establish a new PDN connection.

Figure 7:
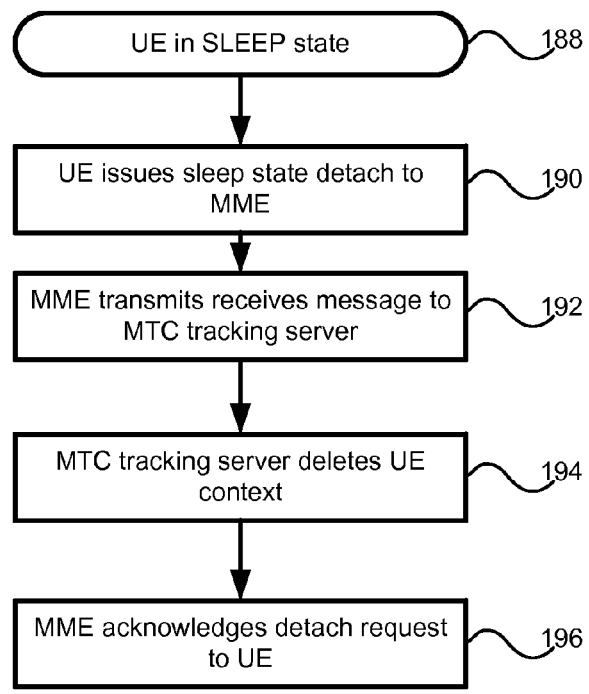
FIG. 7 is a flow chart illustrating a method of the present invention.

A UE that is already in Sleep mode can also be provided with a path directly to the detached state as shown in FIG. 7. Use of this method can obviate the need to wake up the device only to allow it to detach. From the SLEEPING state of step 188, the UE can issue a Sleep Mode Detach request to the MME that will allow it to detach from the network in step 190. To reduce the signaling load, the request can contain minimal information, such as only a UE ID. In response to receipt of the message of step 190, the Sleep Mode Detach request is sent to the MTC tracking Server in step 192. The MTC tracking server, in step 194, removes the UE context and provides an acknowledgement to the MME in step 196. The MME can then provide the confirmation to the UE at which point the UE will be detached.

The above methods, and the use of an MTC tracking server and the network based SLEEP state, can reduce unnecessary signaling as the device moves between the different states illustrated in FIG. 2. The signaling can also be reduced through the use of the Sleep mode TAU procedure. Resources in the network can be re-allocated by storing the context information of Sleeping MTC UE in the MTC Tracking Server. Existing devices and infrastructure need not support the new protocols to interact with infrastructure and devices that do, thus allowing the opportunity to offer backward and forward compatibility which limits the impacts on existing infrastructure. The communications of MTC devices can be improved while the load that such communications place on the network can be ameliorated. These methods and systems also allow for differentiated MTC device and conventional UE device communications handling which will diminish the impact on legacy implementations.

Figure 8:
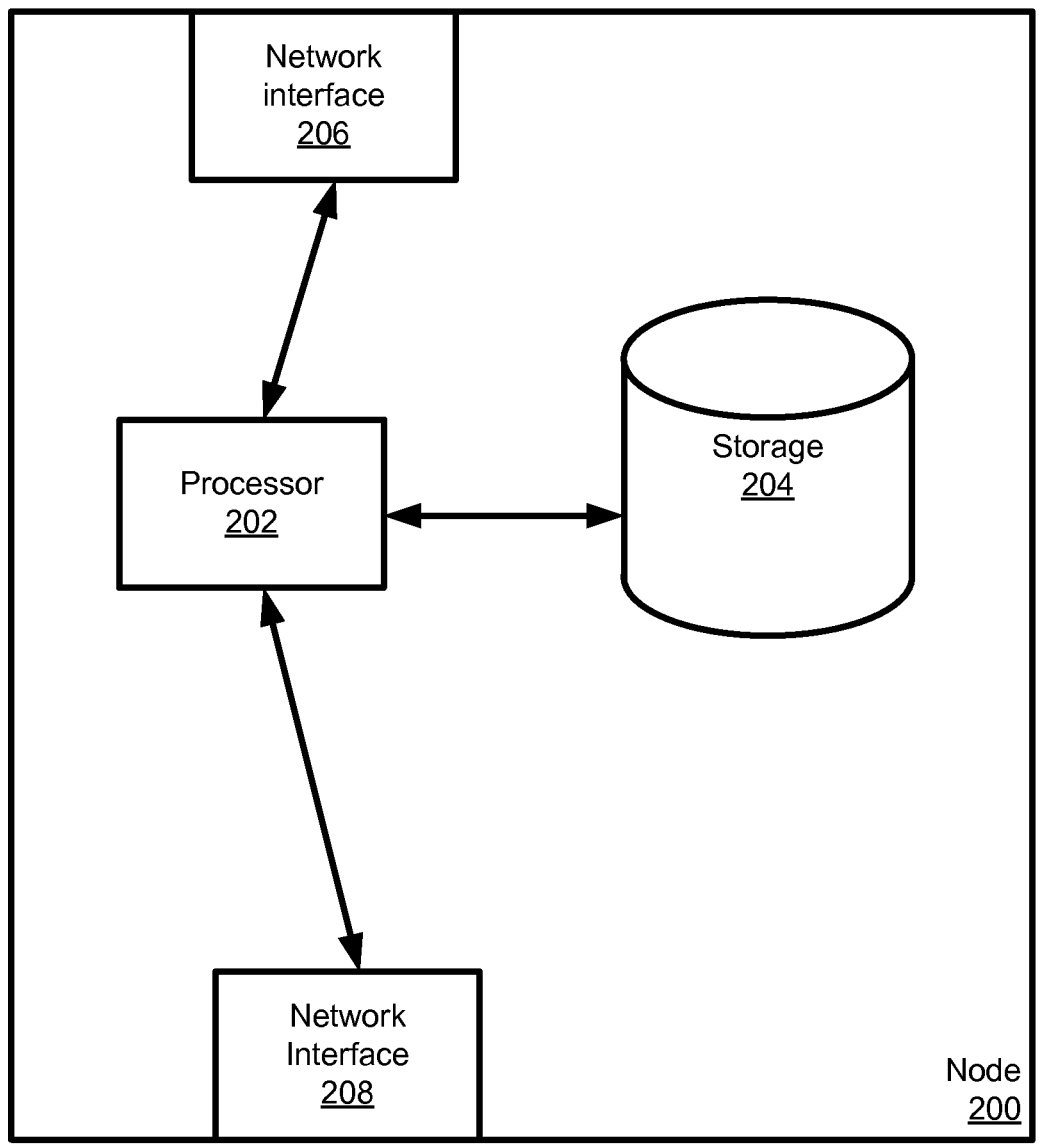
FIG. 8 is a block diagram illustrating a node of the present invention.

FIG. 8 illustrates a generic node of the instant invention. Node 200 includes a processor 202, storage 204, and network interfaces 206 and 208 which may be implemented as a single interface in some nodes. In the MTC UE, it should be noted that only one network interface is required, and it is typically a radio air interface. For the MME, the storage can be used to store the UE context prior to offloading it to the MTC tracking server. In the MTC server, the storage is used to maintain the context information offloaded by the MME. One skilled in the art will appreciate that in each node, the storage can also be used to store machine readable instructions that allow the processor to execute the method outlined in the above figures.

Embodiments of the invention may be represented as a software product stored in a machine-readable medium (also referred to as a computer-readable medium, a processor-readable medium, or a computer usable medium having a computer readable program code embodied therein). The machine-readable medium may be any suitable tangible medium including a magnetic, optical, or electrical storage medium including a diskette, compact disk read only memory (CD-ROM), digital versatile disc read only memory (DVD-ROM) memory device (volatile or non-volatile), or similar storage mechanism. The machine-readable medium may contain various sets of instructions, code sequences, configuration information, or other data, which, when executed, cause a processor to perform steps in a method according to an embodiment of the invention. Those of ordinary skill in the art will appreciate that other instructions and operations necessary to implement the described invention may also be stored on the machine-readable medium. Software running from the machine-readable medium may interface with circuitry to perform the described tasks.

The above-described embodiments of the present invention are intended to be examples only. Alterations, modifications and variations may be effected to the particular embodiments by those of skill in the art without departing from the scope of the invention, which is defined solely by the claims appended hereto.

What is claimed is:

1. A method of managing resources allocated to user equipment in a network, the method comprising:
   receiving, from a user equipment over a radio access network, an indication that the user equipment is entering a low traffic state and that the user equipment is unlikely to change network cells;
   transferring context information associated with the user equipment to a secondary storage;
   de-allocating network resources associated with the user equipment
   receiving from the user equipment a sleep mode tracking area update request;
   calculating a track area list in response to receipt of the sleep mode tracking area update; and
   updating the context information transferred to the secondary storage in accordance with the received tracking area update request and the calculated track area list.

2. The method of claim 1 wherein the step of receiving includes receiving a SLEEP request message.

3. The method of claim 1 wherein the step of transferring includes transferring the context information to an external secondary storage.

4. The method of claim 3 wherein the step of transferring includes transmitting context information stored in a local primary storage to the secondary storage residing in a Machine Type Communication Tracking Server.

5. The method of claim 1 wherein the step of de-allocating network resources includes discarding a portion of the context information transferred to the secondary storage.

6. The method of claim 1 wherein the step of de-allocating network resources includes keeping a first part of the context information transferred to secondary storage, and discarding a second part of the context information transferred to secondary storage.

7. The method of claim 6 wherein the step of de-allocating network resources includes transmitting a message to an external node instructing the external node to release resources allocated to the user equipment.

8. The method of claim 1 wherein the received sleep mode tracking area update request includes an identifier associated with the user equipment.

9. The method of claim 1 wherein the step of updating includes updating location context information in accordance with a location derived in accordance with a network base station through which the sleep mode tracking area update request is received from the user equipment.

10. A node for storing context information about user equipment connected to a radio access network, the node comprising:
    a primary storage for storing context information associated with user equipment;
    a radio interface for receiving requests transmitted over a radio access network from user equipment;
    a network interface for communicating with external nodes; and
    a processor for receiving, from a user equipment over the radio interface, an indication that the user equipment is entering a low traffic state and that the user equipment is unlikely to change network cells, for transmitting to a secondary storage context information associated with the user equipment stored in the primary storage, for deleting at least part of the context information transmitted to the secondary storage from the primary storage, for transmitting a request to at least one external node over the network interface to release resources allocated to the user equipment in response to the receipt of the indication for receiving over the radio interface a sleep mode tracking area update request from the user equipment, and responsive to receipt of the sleep mode tracking area update calculating a track area list in response to receipt of the sleep mode tracking area update and updating the context information transferred to the secondary storage in accordance with the received tracking area update request and the calculated track area list.

11. The node of claim 10 wherein the radio interface is a network interface connecting the node to a radio access network base station.

12. The node of claim 10 wherein the processor receives a SLEEP request message from the user equipment over the radio interface along with the indication that the user equipment is entering a low traffic state.

13. The node of claim 12 wherein the processor transmits context information stored in the primary storage to the secondary storage residing in a Machine Type Communication Tracking Server when it transmits context information associated with the user equipment to the secondary storage.

14. The node of claim 10 wherein the processor keeps a first part of the context information transmitted to the secondary storage and deletes a second part of the context information when it deletes at least a part of the context information.

15. The node of claim 10 wherein the processor receives an identifier associated with the user equipment when it receives a sleep mode tracking area update request from the user equipment over the radio interface.

16. The node of claim 10 wherein the processor updates location context information in accordance with a location derived in accordance with a network base station through which the sleep mode tracking area update request is received as part of updating the context information transferred to the secondary storage.

* * * * *